3,292,618
UNDER-WATER DIVING EQUIPMENT
John E. Davis and Olympio F. Pinto, Sherman Oaks, Calif., assignors to J. Briskin, Inc., Sherman Oaks, Calif., a corporation of California
Filed Nov. 18, 1963, Ser. No. 324,352
2 Claims. (Cl. 128—142)

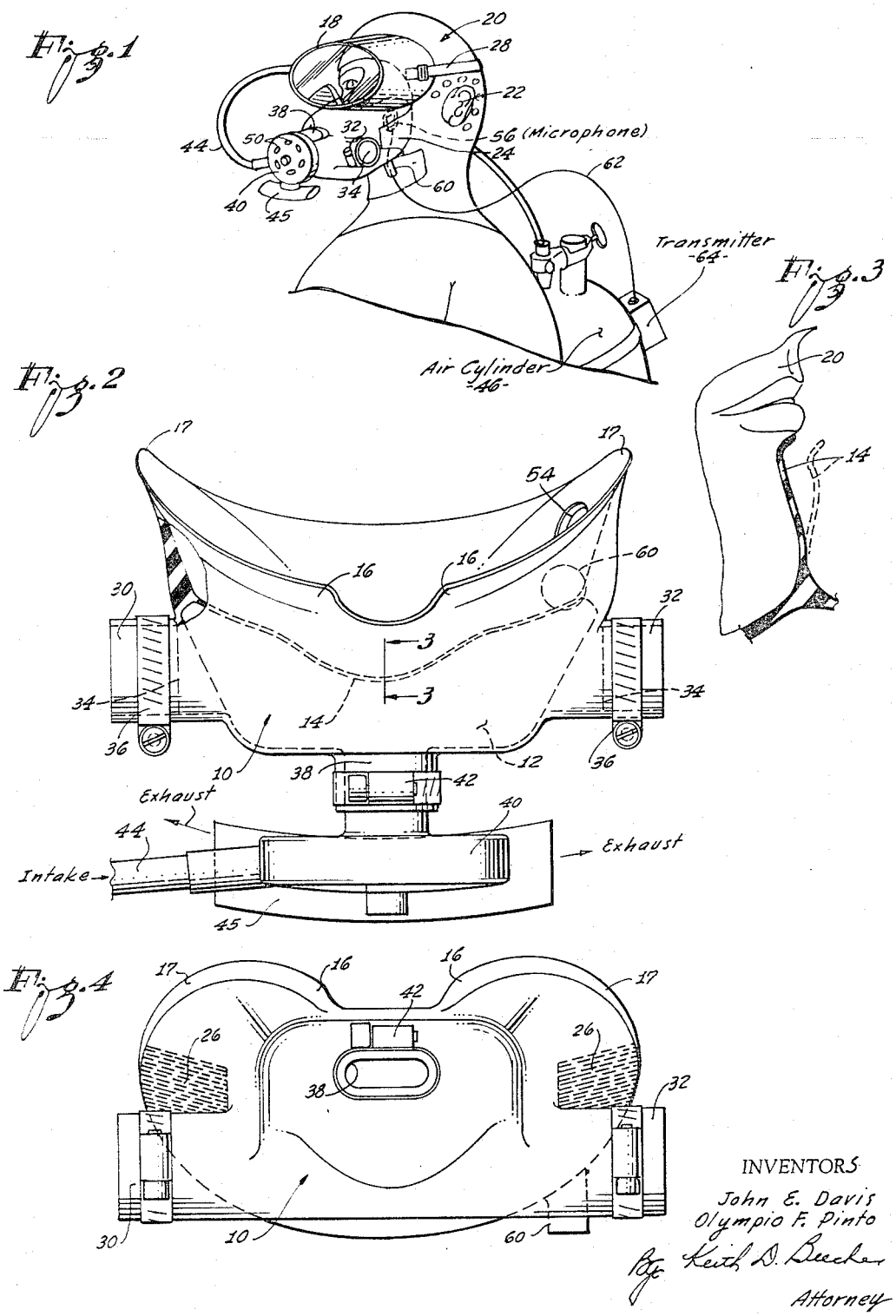

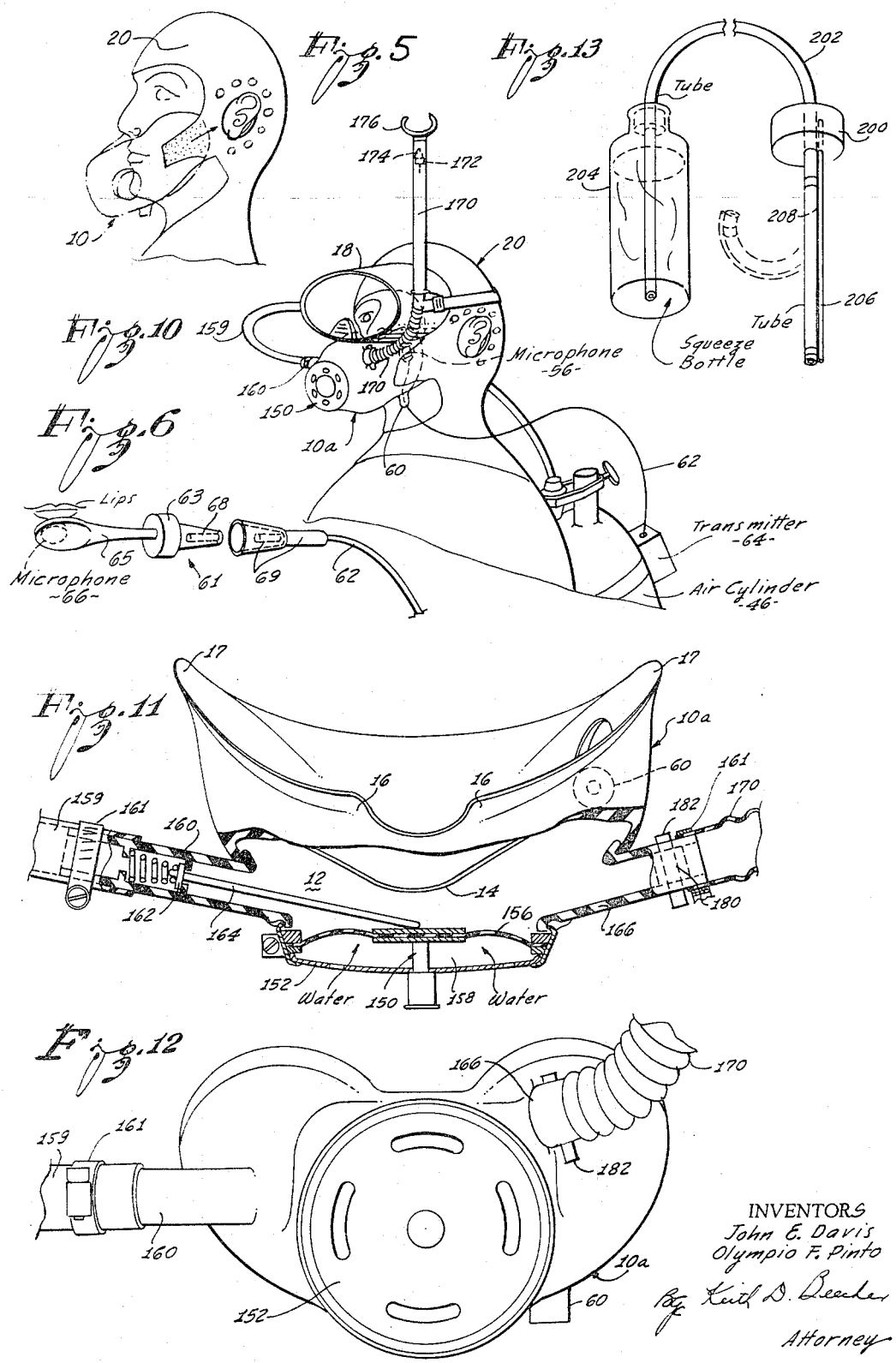

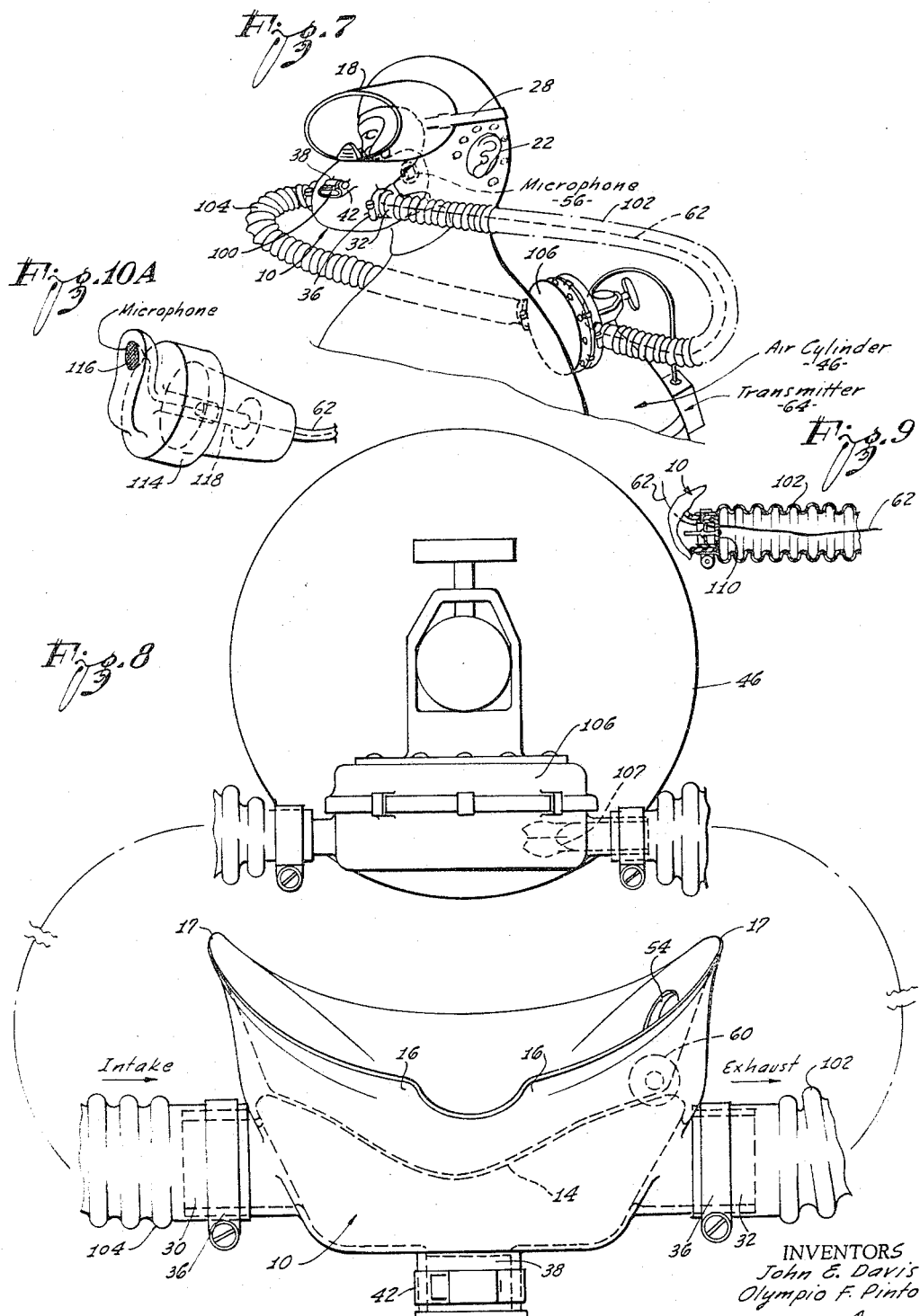

The present invention relates to under-water diving equipment, and it relates more particularly to an improved face mask to be used in conjunction with under-water breathing apparatus.

The usual under-water breathing apparatus includes a mouthpiece which is clenched in the teeth of the diver. The diver breathes through his mouth, in and out of the mouthpiece. For the double-hose type of prior art equipment, two hoses are coupled to the mouthpiece, one for inhaled air and one for exhaled air.

The exhaust hose of the above-mentioned prior art two-hose equipment extends to an apertured water chamber in a demand type regulator valve, and the exhaust air bubbles through the water chamber and out through its apertures. The inlet hose extends to an air chamber in the regulator. The air chamber is coupled to a compressed air cylinder, usually worn on the back of the diver.

A diaphragm separates the water chamber from the air chamber in the aforesaid regulator. When the diver breathes in, a valve closes in the exhaust line, and the diaphragm moves inwardly (assisted by water pressure in the water chamber). The diaphragm is coupled to a valve in the regulator, and the inward motion thereof causes that valve to unseat, so that air flows in from the air cylinder and into the inlet line.

Conversely, when the diver exhales, the valve in the exhaust line opens, and the diaphragm in the regulator moves out against the water pressure in the water chamber. This latter movement of the diaphragm closes the valve in the inlet line.

The single-hose type of prior art equipment is essentially similar to the double-hose type, described briefly above. The exception is that the regulator is mounted directly on the mouthpiece, a single hose is used for the inhaled air, and the exhaled air is passed directly through the regulator. The single-hose type of equipment is more popular for many applications since it has less tendency to get tangled in seaweed, and the like, as compared with the two-hose type.

One-stage regulator systems and two-stage regulator systems are in widespread present-day use. The single hose, one-stage regulator system features a single valve to control the air. This one-stage regulator is less expensive than the two-stage type, and generally operates with less breathing effort.

The two-stage two-hose regulator features two valves in series. The first stage reduces the air in the cylinder from 300 p.s.i., for example, to 30 p.s.i.; and the second stage reduces the air supply to ambient pressure. This latter type of system is preferable for deep diving, beyond 100 feet, for example. Single-hose two-stage regulator systems are also known.

An object of the present invention is to provide an improved mask for use in conjunction with the above-described types of under-water breathing apparatus, and which is intended to replace the prior art mouthpiece which was clenched in the diver's teeth thereby tiring the jaw and eventually creating pains in the teeth of the diver.

Another object of the invention, in one of its aspects, is to provide such an improved diver's mask which is flexible in its use, in that it may be coupled to the single hose or two-hose under-water breathing systems, as desired, by means of a simple adjustment.

Another object of the invention is to provide such an improved mask which is constructed to be worn comfortably and which permits movement of the jaws of the diver, for example, to permit the diver to speak and also to permit him to swallow so as to equalize the internal intra-tympanic (or middle ear) pressure for deep dives.

Another object of the invention is to provide such an improved mask which can be worn comfortably by the diver and which does not exhibit any tendency to leak, even though the diver is talking, or otherwise moving his jaws.

Yet another object of the invention is to provide such an improved mask which is particularly suited for under-water acoustical communication.

A feature of the invention is the provision of such a mask which is constructed to provide a sufficiently large-volume chamber around the mouth of the diver so that under-water communication can be carried out conveniently, and without distortion, and yet without permitting any build-up of carbon dioxide in the mask.

Another feature of the invention is the provision of such a mask having soft resilient sides which extend up each cheek of the diver to the region of his malar bone. This configuration permits the mask to be held tightly against a bony part of the face, rather than against soft tissue, so that even though the diver may be talking, or otherwise moving his jaws, there is no tendency for leakage.

Another feature of the invention is the provision of a combination of a hood (which may be perforated to have a net-like form) and the aforementioned mask, fastened together by clips, or other appropriate means to be described, so that the mask is held in place without the usual prior art confusion of head straps, or the like, the hood and mask being sealed to one another at the aforementioned malar bone of the diver.

Yet another feature of the invention is the provision of a soft, flexible, integral, internal mounting member which covers the diver's chin, and which moves in conformity with the face muscles as the diver moves his jaw.

A still further feature is the provision of such a mask having a soft, thin upper edge engaging the upper lip of the diver, directly under his nose, and which has a configuration so as to permit the mask to fit under or over the lower rim of the usual goggle mask worn by the diver, without any tendency towards leakage.

Other objects, advantages and features of the invention will become apparent from a consideration of the following description, when the description is considered in conjunction with the accompanying drawings, in which:

FIGURE 1 is a perspective view of an improved diving mask-hood combination constructed in accordance with one embodiment of the invention, as typically worn by the diver;

FIGURE 2 is a top view, partly in section, of the mask portion of the combination shown in FIGURE 1;

FIGURE 3 is a side sectional view of the mask of FIGURE 2 taken essentially on the line 3—3 of FIGURE 2;

FIGURE 4 is a front elevational view of the improved mask of FIGURE 2;

FIGURE 5 is a further view of the mask-hood combination of FIGURE 1, and illustrating the manner in which the mask and hood are fastened at the cheek bone of the diver;

FIGURE 6 is a view of a microphone and jack-plug attachment which can be used in conjunction with the mask of FIGURE 1;

FIGURE 7 is a perspective view of the diving mask-hood combination of FIGURE 1, adapted to a second type of under-water breathing apparatus;

FIGURE 8 is a top view of a demand valve regulator assembly incorporated into the breathing equipment of FIGURE 7, and also of the mask of FIGURE 7, and illustrative of the manner in which the connections of the breathing apparatus are coupled to the mask;

FIGURE 9 is a fragmentary sectional view of one of the components of the breathing equipment of FIGURE 7;

FIGURE 10 represents a mask-hood combination constructed in accordance with a further embodiment of the invention;

FIGURE 10A is a view of a microphone assembly which can be used with the mask of FIGURE 7;

FIGURE 11 is a top view, partly in section, of the mask portion of the mask-hood combination of FIGURE 10;

FIGURE 12 is a front view of the mask of FIGURE 11; and

FIGURE 13 shows a further attachment for the mask-hood combination of the invention.

The embodiment of the invention shown in FIGURES 1-5 includes a mask 10. This mask is formed of a waterproof material, such as rubber, and it is configured to define a chamber 12 in front of the mouth of the diver. The mask 10 has an inner resilient wall portion 14 which extends over the chin of the wearer, as best shown in FIGURE 3.

The mask 10 also includes a thin resilient upper edge 16 which is configured to extend over the upper lip of the diver, and around his nose. This thin upper edge 16 is particularly adapted to extend under or over the lower edge of the usual goggle mask 18 (FIGURE 1) worn by the diver.

The improved mask 10 also includes thin integral flexible sides 17. These sides are resilient, and they extend up the cheeks of the diver, and terminate at the region of the malar bone on each cheek. This configuration provides a water-proof termination for the mask on the bony structure of the cheek, rather than on soft tissue. Therefore, as the diver talks, or otherwise moves his jaws, there is no tendency for the sides to move outwardly and for leakage to occur.

The mask 10 is held in place over the mouth of the diver by means of a hood 20. The hood 20 may be composed of a thin membrane material, and it is drawn down over the head of the diver. Suitable apertures 22 are provided in the sides of the hood, so that the ears of the diver may extend through the hood, and to provide added exposed surface for bone conduction of sound waves. The hood 20 may be worn under a space helmet, or the like, if so desired.

The hood 20 has a pair of flaps, such as the flap 24, and these flaps extend over the sides 17 of the mask 10 in over-lapping relationship. The flaps 24 of the hood 20 cross the sides 17 of the mask 10 in the region of the bony portion of the diver's cheek. The flaps 24 are configured so as to provide an optimum holding strength for the mask 10, when they are fastened to the mask.

The flaps 24 are fastened detachably to the mask 10 by any appropriate means, such as by appropriate clips, or snaps. Conversely, fasteners such as those presently marketed under the trade name "Velcro" may be used. These latter fasteners comprise a multiplicity of small plastic hooks positioned, for example, on the under surface of the flaps 24. The hooks extend into pads 26 (FIGURE 4) on the outer surface of the mask 10. These pads 26 may be formed of spun nylon for example. Then, when the plastic hooks on the under surface of the flaps 24 are pressed into the spun nylon pads 26, a firm and strong bond is provided between the mask 10 and the hood 20.

The above-described combination provides a convenient means whereby the mask 10 is supported over the mouth of the diver. This obviates the need for a multiplicity of straps, which tend to confusion and which tend to become tangled. The only strap required is, for example, the strap 28 which holds the goggle mask 18 in place.

As mentioned above, the mask 10 in the embodiment of FIGURES 1-5 is adapted for use in conjunction with the two-hose type of system, or with the single-hose type. For this purpose, a pair of tubular boss projections 30 and 32 are formed integral on opposite sides of the mask 10. These tubular bosses communicate with the chamber 12 inside the mask. In the embodiment of FIGURE 1, a single-hose type of breathing equipment is used. For that reason, appropriate plugs, such as the plug 34 are fitted into the tubular bosses 30 and 32 and clamped in place by appropriate clamps 36. These plugs 34 are preferably formed of a suitable solid impervious plastic material.

The mask 10 in the embodiment of FIGURE 1 is equipped with a tubular integral boss projection 38 at the front of the mask, and this projection is adapted to receive a demand valve regulator assembly 40. The regulator assembly 40 has a projecting portion which extends into the tubular boss 38, and it is clamped in place by an appropriate clamp 42. In this manner, the regulator 40 is held in place on the mask 10.

The regulator 40 is of usual known type, and it includes an exhaust portion 45 and apertures 50. A single hose 44 extends back from the regulator to a compressed air cylinder 46 strapped to the back of the diver. The hose 44 is coupled to the valve assembly 48 of the air cylinder by a known and usual fitting.

In the operation of the assembly of FIGURES 1-5, the regulator 40 is controlled by the breathing of the diver, as explained above. When the diver inhales, air is drawn from the air cylinder 46 through the hose 44 into the internal chamber 12 of the mask 10. Then, when the diver exhales, the exhaust air passes out through exhaust portion 45 of the regulator. The equipment of FIGURE 1 may, as explained above, be of the single-stage or two-stage regulator type.

The mask 10 also is configured to provide an internal pocket 54 for receiving a bone conduction type of microphone 56. An integral boss 60 is formed on the mask 10 adjacent the pocket 54, and the coaxial cable 62 from the microphone extends out of the mask through the boss and to a transmitter 64 supported on the back of the diver. The transmitter 64 is of the acoustical type, and it causes sound waves to be set up in the water, when the diver talks, for communication through the water with other adjacent divers.

For cold water diving, an outer hood of similar configuration may fit over the inner hood 20. In either event, the ears of the diver are preferably exposed, so that communication can be maintained with other divers wearing like equipment.

The microphone 56 may be sealed in a plastic bubble, for water-proofing purposes. Also, an appropriate waterproof plug may be inserted in the boss 60 to permit the cable 62 to be detached at will.

In the operation of the combination shown in FIGURES 1-5, to put on the equipment, the diver merely places the mask 10 in place over his mouth, and draws the hood 20 down over his head, and fastens these two components together. The sides 17 of the mask extend up to the region of the bony portion of the cheek, as mentioned above, and are held there by the hood flaps 24 so that movement of the diver's jaws, has no effect on the water-tight characteristics of the mask.

The mask-hood combination of the invention is eminently comfortable, in that it does not need to be clenched in the teeth of the diver. The mask 10 itself is formed of a soft resilient material, and it comfortably fits over the face of the diver and follows the contour of his face regardless of its shape or individual characteristics.

If so desired, the bone conduction microphone 56 may be replaced by a microphone assembly 61, such as shown in FIGURE 6. This latter assembly is adapted to extend through one of the tubular boss projections 32 into the inner chamber 12. For that purpose, the corresponding plug 34 is removed, and the assembly 61 of FIGURE 6 is inserted in its place, and tightly clamped by the corresponding clamp 36.

The assembly 61 includes a plastic base 63 which conforms in shape to the plug 34, so that it can be clamped into the tubular projection 32. Extending inwardly from the plastic base 63 is an integral boom 65, a microphone 66 being mounted at the end of the boom. The assembly 61 is configured so that when it is in place in the mask 10, the microphone 66 is held in front of the mouth of the diver, or touching the lips for direct contact.

A water-proof electrical jack 68 is mounted on the other side of the base 63. The microphone cable 62 is provided with a water-proof plug 69, which is adapted to be inserted into the jack 68. The assembly of FIGURE 6 is convenient, in that it permits the microphone to be removed conveniently, whenever communication is not desired, or when repairs or replacement for the microphone are needed.

In the embodiment of FIGURES 7, 8 and 9, the mask 10 is adapted to receive the two-hose type of breathing equipment, rather than the single hose of FIGURE 1. In the latter embodiment, the tubular projection 38 is plugged by an appropriate plug 100 formed, for example, of water impervious plastic, the plug 100 being clamped in place by the clamp 42.

The under-water breathing equipment shown in FIGURES 7, 8 and 9 includes an exhaust tube 102 which is clamped to the tubular projection 32 by the corresponding clamp 36, and it includes an inlet hose 104 which is clamped to the tubular projection 30 by the corresponding clamp 36. The hoses 102 and 104 extend to a pressure regulator demand valve 106 which is positioned on the back of the diver, adjacent the air cylinder 46.

It will be appreciated that the improved mask-hood combination of the present invention can be readily adapted for use with the single-hose type of under-water breathing equipment, shown in FIGURE 1, or with the two-hose type of equipment, shown in FIGURE 7, merely by removing the appropriate plugs, and clamping the corresponding hoses in place.

The breathing equipment of FIGURES 7, 8 and 9 operates in known manner. When the diver inhales, the resulting vacuum exerted through the hose 104 causes the demand valve in the regulator 106 to open, so that air is supplied to the chamber 12 in the mask. Then when the diver exhales, a valve in the exhaust hose 102 adjacent the tubular portion 32 opens, so that exhaust air may be carried to the regulator 106 to bubble through the water chamber in the regulator, in a manner similar to that described above in conjunction with the demand valve 40. The air breathing arrangement of FIGURES 7–9 has certain advantages, in that the exhaust bubbles issue behind the diver, and do not tend to obscure his vision, as in the embodiment of FIGURE 1.

As shown in FIGURE 9, a usual exhaust valve 110 is included in the exhaust hose 102 adjacent the portion 32 of the mask 10. A flapper valve 107 is preferably included in the remote end of the exhaust tube 102 in the regulator 106, so as to prevent water from entering the exhaust hose.

If desired, the microphone cable 62 may be taken out through the exhaust hose 102, so as to reduce the tendency for it to become tangled with external objects and broken. For that purpose, an aperture is provided in the exhaust valve 110, as shown in FIGURE 9, and the cable passes through the aperture. An appropriate water-proof sealing bushing is provided between the cable 62 and the aperture in the exhaust valve.

If so desired, the microphone 56 in FIGURE 7 may be replaced by the microphone assembly of FIGURE 10A. The microphone assembly of FIGURE 10A is intended to be plugged in through the hollow tubular boss 38. For that purpose, the plastic plug 100 is removed, and the plastic base 114 of the assembly of FIGURE 10A is clamped in place. The base 114 supports a microphone 116, and when it is clamped in place in the tubular member 38, the microphone is held in front of, or in contact with, the mouth of the diver. A jack-plug combination 118, similar to the combination of FIGURE 6, may be incorporated in the base 114.

In the embodiment of FIGURES 10–12, the mask 10 has been modified, and is designated 10a. This latter mask incorporates the demand valve regulator as an integral unit. This regulator is designated generally as 150. As best shown in FIGURE 11, the assembly 150 includes an outer apertured metallic wall 152, and it includes an internal flexible diaphragm 156. The diaphragm defines a water chamber 158 with the wall 152. The diaphragm is water tight, and it separates the water chamber 158 from the internal chamber 12 of the mask.

The inlet hose 159 is clamped to a tubular boss 160 on one side of the mask 10a, by a clamp 161. This boss communicates with the interior of the chamber 12. A spring loaded valve assembly 162 is positioned in the boss 160, and this assembly includes a rod-like valve actuator 164. The valve actuator 164 extends into engagement with the inner surface of the diaphragm 156.

Then, as the diver inhales, the diaphragm 156 moves inwardly. This causes the valve actuator 164 to unseat the valve head in the valve 162, so as to permit air to enter the chamber 12. Then, when the diver exhales, the diaphragm 156 moves outwardly, and away from the actuator 164, so the valve closes.

It will be appreciated that the pressure on either side of the diaphragm 156 is substantially equalized, by the air in the chamber 12, and by the water in the water chamber 150. It will also be appreciated that the diaphragm 156 conveniently serves as a transducer, so as to permit communication, even without the microphone 56 to be carried out. Any speech by the diver sets up a corresponding vibration in the diaphragm 156, which, in turn, sets up acoustic vibrations in the water, these latter vibrations being communicated to adjacent divers.

The mask 10a of FIGURES 10–12 includes a further boss 166. This boss may be located on the opposite side of the mask, as shown, or it may be located on the same side as the inlet boss 160. When both bosses are located on the inlet side, all tubes and wires may be clipped together, and out of the way of the diver.

A snorkel 170 may be clamped to the exhaust boss 166. The snorkel serves to remove the exhaust bubbles from the vicinity of the diver, so as to minimize the interference of these bubbles in the vision of the diver, and in his ability to hear acoustical communications through the water from other divers.

The snorkel 170 includes a usual exhaust valve 172 at its upper end. A screen 174 may also be provided, and this screen serves to break the bubbles into small, fine form, so as to minimize their interference in the acoustical communication. A mouthpiece 176 may be provided at the upper end of the snorkel, and this mouthpiece may be clenched in the teeth of another diver, so as to provide air to the other diver.

The snorkel 170 may be coupled to the boss 166 through an appropriate fitting 180. This fitting is equipped with a manually operated valve 182. In one position, the valve 182 serves as an exhaust valve, so that both ends of the snorkel 170 are sealed for intake, so as to prevent the formation of carbon dioxide pockets. The valve 182 may have a second position in which it is open. This second position permits the equipment to be used under circumstances in which the exhaust valve 172 is omitted, and the snorkel is actually permitted to extend above the surface of the water.

As a further feature, one of the plugs 34 in FIGURE 1 may be removed, and replaced by the assembly of FIGURE 13. The latter assembly includes a plastic disc 200 which may be clamped in the corresponding tubular projection 32. A flexible tube 202, composed, for example, of vinyl, or the like, extends through the plug 200 and into the chamber 12. The remote end of the tube 202 extends down into a flexible container 204. The container 204 is the usual "squeeze bottle," and it may contain fresh water, honey, or other food or nutrition for the diver.

A second tube 206 is formed adjacently to tube 202 within the chamber 12, and this latter tube includes a flexible wire 208 composed, for example, of silver. The wire 208 permits the assembled tubes 202 and 206 to be bent into any desired configuration, and out of the way during normal operation of the mask. When the diver desires nourishment, he removes the mask, and straightens out the tubes 202 and 206. He then replaces the mask and blows the water out of the mask. He then puts the tubes 202, 206 in his mouth, squeezes the container 204, and receives the nourishment.

The feeding tube 202 may include suitable and usual non-return valves to avoid reverse flow and resulting contamination of the food by salt water. Detachable couplings may be used for the tube for convenient handling.

The invention provides, therefore, an improved mask and mask-hood combination for use in conjunction with under-water breathing equipment. Although the mask-hood combination of the invention is particularly suited for use in conjunction with under-water communication equipment, it also finds general utility.

An important feature of the mask of the present invention, as described above, is the fact that it may be worn by the diver in a comfortable and secure manner, and is not susceptible to leakage. Also, the mask of the invention is conveniently worn by the diver, without impeding his ability to move his jaws, for the added comfort of the diver, and so as to permit him to talk.

Although described in conjunction with under-water diving equipment, it is apparent that the improved hood-mask assembly of the invention has general application. For example, the assembly may be used by pilots, astronauts, and the like, for breathing, speaking, eating, emergencies, and so on.

Therefore, while particular embodiments of the invention have been shown and described, modifications may be made. It is intended in the claims to cover such modifications which fall within the scope of the invention.

What is claimed is:

1. A mask for use in conjunction with under-water breathing equipment, said mask being formed of waterproof material and having a solid body portion configured to define a chamber around the mouth of the wearer; said mask having a soft resilient compliant inner wall integral with said body portion and extending upwardly from the bottom portion thereof and across said chamber from one side of the body portion to the other and outwardly of the bottom edge, said inner wall enclosing the lower portion of said chamber and being configured together with the bottom portion to conform with the contour of the chin of the wearer, and being positioned to bear against the chin of the wearer in watertight sealing engagement therewith and to move with movements of the chin while maintaining such water-tight sealing engagement; said mask further having soft resilient, compliant sides formed integral with said body portion and configured to extend rearwardly and up each cheek of the wearer over a substantial portion of each cheek and to the bony region thereof, said resilient compliant sides being positioned to bear against the cheeks of the wearer in a water-tight sealing engagement therewith, and to maintain such water-tight sealing engagement in the presence of jaw movements of the wearer; and said mask further having a thin soft resilient compliant upper edge formed integral with said body portion and extending upwardly from the top surface of said body portion, said upper edge being configured to extend over the upper lip of the wearer with the inner surface thereof engaging such upper lip over essentially the entire surface thereof, and said upper edge being configured to bear against the upper lip of the wearer in water-tight sealing relationship therewith directly under the nose of the wearer; an opening in the front of said chamber a diaphragm mounted on said body portion extending across said opening to form an outer wall for the chamber; an apertured wall mounted on said body portion to form a water chamber on the outer side of said diaphragm; inlet means mounted on said body portion for supplying inlet air to said chamber and including a valve; valve actuator means coupled to said valve and extending to said diaphragm to open said valve when said diaphragm is drawn inwardly in response to inhaling by the wearer; and exhaust means mounted on said body portion and including an exhaust valve adapted to open in response to exhaling by the wearer.

2. The mask defined in claim 1 which includes at least one solid tubular boss communicating with said chamber, said boss formed integral with said body portion and extending outwardly therefrom to form said inlet means, and with said valve being included in said boss.

References Cited by the Examiner

UNITED STATES PATENTS

| | | | |
|---|---|---|---|
| 1,336,437 | 1/1921 | Wagenhorst | 128—142 |
| 2,317,237 | 4/1943 | Wilen. | |
| 2,587,958 | 3/1952 | Belloni | 128—142 |
| 2,758,596 | 8/1956 | Cupp | 128—142 |
| 3,123,680 | 3/1964 | Minton et al. | 128—147 X |
| 3,138,154 | 6/1964 | Hedberg | 128—142 |
| 3,174,129 | 3/1965 | Laughlin et al. | 179—156 X |

FOREIGN PATENTS

| | | |
|---|---|---|
| 492,664 | 9/1934 | Great Britain. |

RICHARD A. GAUDET, *Primary Examiner.*

W. E. KAMM, *Assistant Examiner.*